(12) United States Patent
Ragan

(10) Patent No.: US 8,826,152 B2
(45) Date of Patent: *Sep. 2, 2014

(54) DISPLAYING ICON LAYOUTS IN DIFFERENT RESOLUTIONS

(75) Inventor: Gene Z. Ragan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/244,143

(22) Filed: Sep. 23, 2011

(65) Prior Publication Data

US 2012/0017163 A1    Jan. 19, 2012

Related U.S. Application Data

(63) Continuation of application No. 10/875,068, filed on Jun. 22, 2004, now Pat. No. 8,065,629.

(51) Int. Cl.
*G06F 3/00* (2006.01)
*G06F 3/01* (2006.01)

(52) U.S. Cl.
USPC ............................. 715/760; 715/788; 715/800

(58) Field of Classification Search
USPC .......................................... 715/760, 788, 800
See application file for complete search history.

(56) References Cited

U.S. PATENT DOCUMENTS

| | | | |
|---|---|---|---|
| 5,500,923 A | 3/1996 | Kuroshima et al. | |
| 5,513,342 A * | 4/1996 | Leong et al. | 715/798 |
| 5,544,288 A | 8/1996 | Morgan et al. | |
| 5,548,692 A | 8/1996 | Cok | |
| 5,592,605 A | 1/1997 | Asuma et al. | |
| 5,684,970 A | 11/1997 | Asuma et al. | |
| 5,751,283 A * | 5/1998 | Smith | 715/798 |
| 5,760,772 A | 6/1998 | Austin | |
| 5,761,686 A | 6/1998 | Bloomberg | |
| 5,844,559 A | 12/1998 | Guha | |
| 5,847,706 A * | 12/1998 | Kingsley | 715/788 |
| 5,883,635 A * | 3/1999 | Rao et al. | 345/440 |
| 5,930,150 A | 7/1999 | Cohen et al. | |
| 6,335,743 B1 * | 1/2002 | Owings | 715/801 |
| 6,421,134 B1 | 7/2002 | Kuroshima et al. | |
| 6,473,102 B1 * | 10/2002 | Rodden et al. | 715/788 |
| 6,694,487 B1 | 2/2004 | Ilsar | |

(Continued)

OTHER PUBLICATIONS

U.S. Appl. No. 10/875,068, filed Jun. 22, 2004, Ragan, Gene Z.

(Continued)

*Primary Examiner* — Nicholas Augustine
(74) *Attorney, Agent, or Firm* — Robert C. Kowert; Meyertons, Hood, Kivlin, Kowert & Goetzel, P.C.

(57) ABSTRACT

A method for displaying icons layouts in different resolutions where data representing a layout is preserved for a particular resolution and is later used to display another layout at the same resolution. The data indicates positions of icons in the layout, contains identifiers that identify particular icons, and contains coordinate positions of icons in the layout and may be preserved in various formats or preserved in various data structures. The data structure may comprise a bitmap and icon list. In some embodiments, a layout at a current resolution is produced using a previous layout at a previous resolution and at least two different mapping functions. Icons from the previous layout are mapped to the current layout where icons in an overlapping area between the current layout and the previous layout are mapped with a first mapping function and outside icons are mapped with a second mapping function.

20 Claims, 10 Drawing Sheets

(56) References Cited

U.S. PATENT DOCUMENTS

| | | | |
|---|---|---|---|
| 6,708,309 B1 | 3/2004 | Blumberg | |
| 6,891,553 B2 | 5/2005 | White et al. | |
| 6,983,424 B1 * | 1/2006 | Dutta | 715/800 |
| 7,028,258 B1 | 4/2006 | Thacker et al. | |
| 7,046,848 B1 | 5/2006 | Olcott | |
| 7,222,306 B2 | 5/2007 | Kaasila et al. | |
| 7,274,382 B2 * | 9/2007 | Plut | 345/660 |
| 7,302,648 B1 | 11/2007 | Brunner et al. | |
| 7,370,284 B2 * | 5/2008 | Andrea et al. | 715/788 |
| 7,398,478 B2 * | 7/2008 | Wu et al. | 715/800 |
| 7,480,872 B1 | 1/2009 | Ubillos | |
| 2002/0027563 A1 | 3/2002 | Van Doan et al. | |
| 2002/0191027 A1 * | 12/2002 | Morrow et al. | 345/788 |
| 2003/0095135 A1 | 5/2003 | Kaasila et al. | |
| 2004/0183817 A1 | 9/2004 | Kaasila | |

OTHER PUBLICATIONS

Portions of prosecution history of U.S. Appl. No. 10/875,068, filed Jun. 20, 2011, Ragan, Gene Z.

* cited by examiner

DISPLAYING ICON LAYOUTS IN DIFFERENT RESOLUTIONS

CLAIM OF BENEFIT TO PRIOR APPLICATIONS

This application is a continuation application of U.S. patent application Ser. No. 10/875,068, filed Jun. 22, 2004 now U.S. Pat. No. 8,065,629. U.S. patent application Ser. No. 10/875,068 is incorporated herein by reference.

FIELD OF THE INVENTION

The present invention relates to displaying icon layouts in different resolutions.

BACKGROUND OF THE INVENTION

Icons can be displayed in a graphical user interface (GUI) at different resolution settings. The resolution level of a display is expressed as a matrix or array of pixels where standard resolution settings include 640×480, 800×600, 1024×768, 1152×870, 1600×1200, etc. For example, the resolution of 1024×768 indicates a pixel array of 1024 columns and 768 rows of pixels.

Typically, when a user changes between resolutions, the placement of icons in the GUI from the initial resolution to the changed resolution is not intuitive so that icons in the changed resolution do not appear where the user expects. An example of the typical placement of icons between an initial resolution to a changed resolution is shown in FIG. 1. As shown in FIG. 1, a first icon layout 105 is shown in a first resolution of a display, the first layout 105 having icons "A," "B," "C," "D," E," and "F" 110 and 115. After the user changes the resolution setting of the display from the first resolution to a second resolution, a second icon layout 140 is shown in the second resolution, the second layout 140 also having icons "A," "B," "C," "D," E," and "F" 110 and 115 of the first layout 105.

Note that in the example of FIG. 1, the resolution has been changed from a higher resolution (first resolution) to a lower resolution (second resolution) so that the first layout 105 is larger than the second layout 140 (i.e., the first layout is a pixel array with more columns and rows of pixels than the second layout). A boundary 120 of the second layout or resolution in comparison to the first layout or resolution is indicated by a dashed boundary line in the first layout 105.

Inside icons 110 within the boundary 120 (such as icons "A," "B," "C," and "F") can be easily mapped from the first layout to the second layout, for example, using a one-to-one mapping function that places the icons in the same position in the second layout. Typically, however, outside icons 115 (such as icons "E" and "D") outside the boundary 120 are placed in the first available space in the second layout which causes such outside icons 115 to be placed in a position that is not intuitive to the user. For example, as shown in FIG. 1, outside icon "D" is positioned in the lower right corner of the first layout but is placed in the upper right corner (the first available position) of the second layout.

After the user changes the resolution setting of the display back to the first resolution, a third icon layout 150 is shown in the first resolution. As the resolution has been changed from a lower resolution (second resolution) to a higher resolution (first resolution), the third layout 150 is larger than the second layout 140. As such, all icons 110 and 115 of the second layout 140 can be mapped from the second layout to the third layout using a one-to-one mapping function. Note, however, that when the user returns to the first resolution, the third layout does not contain icons in the same position as they were in the first layout at the same first resolution. For example, the outside icons "E" and "D" are in different positions in the first and third layouts even though both layouts are in the same resolution.

As such, there is a need for a method of displaying icons layouts in different resolutions where the placement of the icons between different layouts in different resolutions is more intuitive.

SUMMARY OF THE INVENTION

The present invention provides a method for displaying icons layouts in different resolutions. In some embodiments, data representing an icon layout is preserved (created and stored) for a particular resolution setting and is later retrieved and used to display another icon layout in the same particular resolution. Data created for a layout at a particular resolution setting indicates positions of icons in the layout, contains identifiers that uniquely identify particular icons in the layout, and contains coordinate positions of icons in the layout. In some embodiments, data representing an icon layout is preserved in various formats, such as Extensible Markup Language (XML), HyperText Markup Language (HTML), etc.

In some embodiments, data representing an icon layout is preserved in a data structure. In some embodiments, the data structure comprises a bitmap and an icon list. In these embodiments, the bitmap indicates positions of icons in the layout while the icon list contains identifiers that uniquely identify particular icons in the layout and contains coordinate positions of icons in the layout. The icon list is associated with the bitmap and is used in conjunction with the bitmap to display icon layouts in a particular resolution. In other embodiments, however, the data structure is any type of persistent data structure having any form and may be, for example, a list, a hashtable, a simple flat database, vectors of data, etc.

If an icon is modified between the different layouts of the same resolution, the icon will be modified accordingly using information from a previous layout. If an icon is left unmodified between different layouts of the same resolution, the icon will appear in the same position in all layouts of the resolution (regardless of the number of resolution changes between the layouts), thus providing a more intuitive positioning of the icon in the layouts.

In some embodiments, an icon layout at a current resolution is produced using a previous layout at a previous resolution and at least two different mapping functions. In these embodiments, icons from the previous layout are mapped to the current layout where icons in an overlapping area between the current layout and the previous layout are mapped with a first mapping function and icons outside the overlapping area are mapped with a second mapping function.

DETAILED DESCRIPTION OF THE INVENTION

In the following description, numerous details are set forth for purposes of explanation. However, one of ordinary skill in the art will realize that the invention may be practiced without the use of these specific details. In other instances, well-known structures and devices are shown in block diagram form in order not to obscure the description of the invention with unnecessary detail.

The present invention provides a method for displaying icons layouts in different resolutions. In some embodiments, data representing an icon layout is preserved (created and stored) for a particular resolution setting and is later retrieved and used to display another icon layout in the same particular resolution. Data created for a layout at a particular resolution setting indicates positions of icons in the layout, contains identifiers that uniquely identify particular icons in the layout, and contains coordinate positions of icons in the layout. In some embodiments, data representing an icon layout is preserved in various formats, such as Extensible Markup Language (XML), HyperText Markup Language (HTML), etc. In some embodiments, data representing an icon layout is preserved in a data structure. In some embodiments, the data structure comprises a bitmap and an icon list. In other embodiments, however, the data structure is any type of persistent data structure having any form and may be, for example, a list, a hashtable, a simple flat database, vectors of data, etc.

Figure 1:
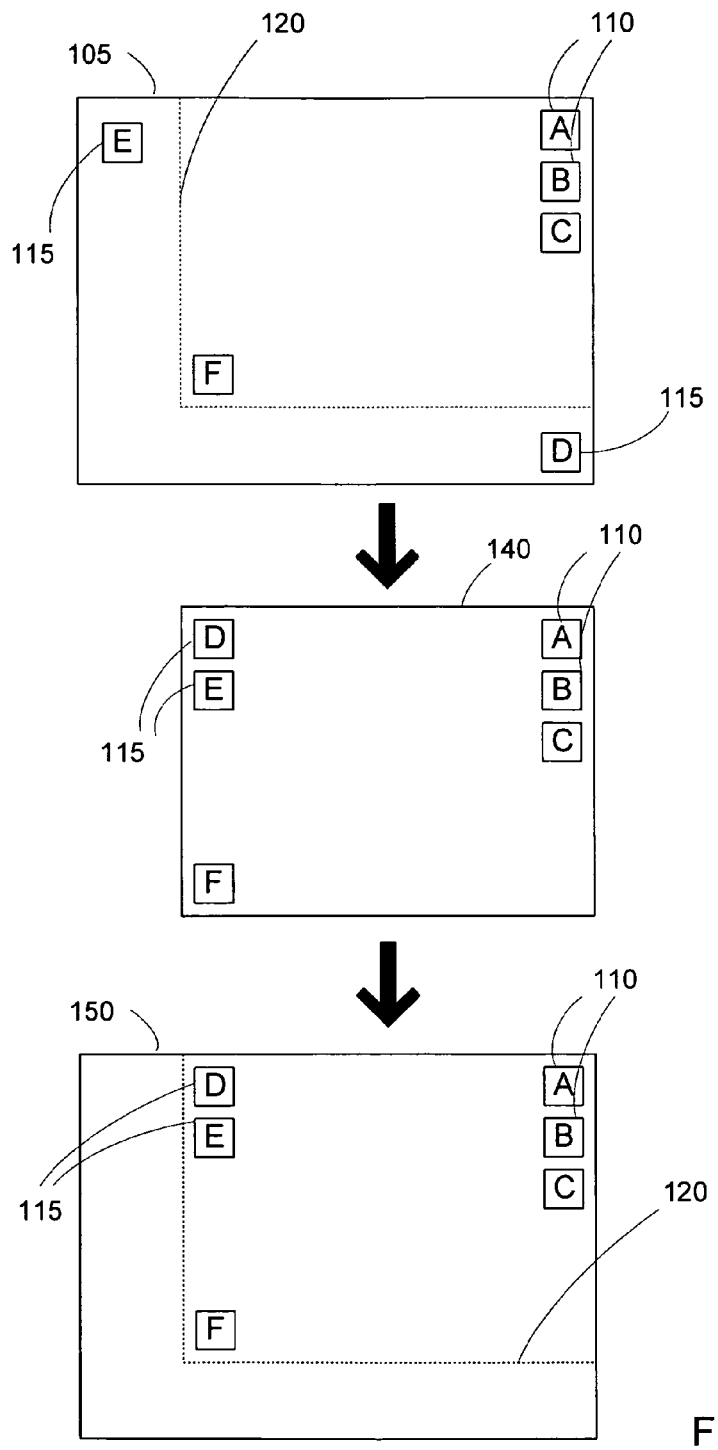
FIG. 1 shows typical placement of icons between layouts at different resolutions.
Figure 2:
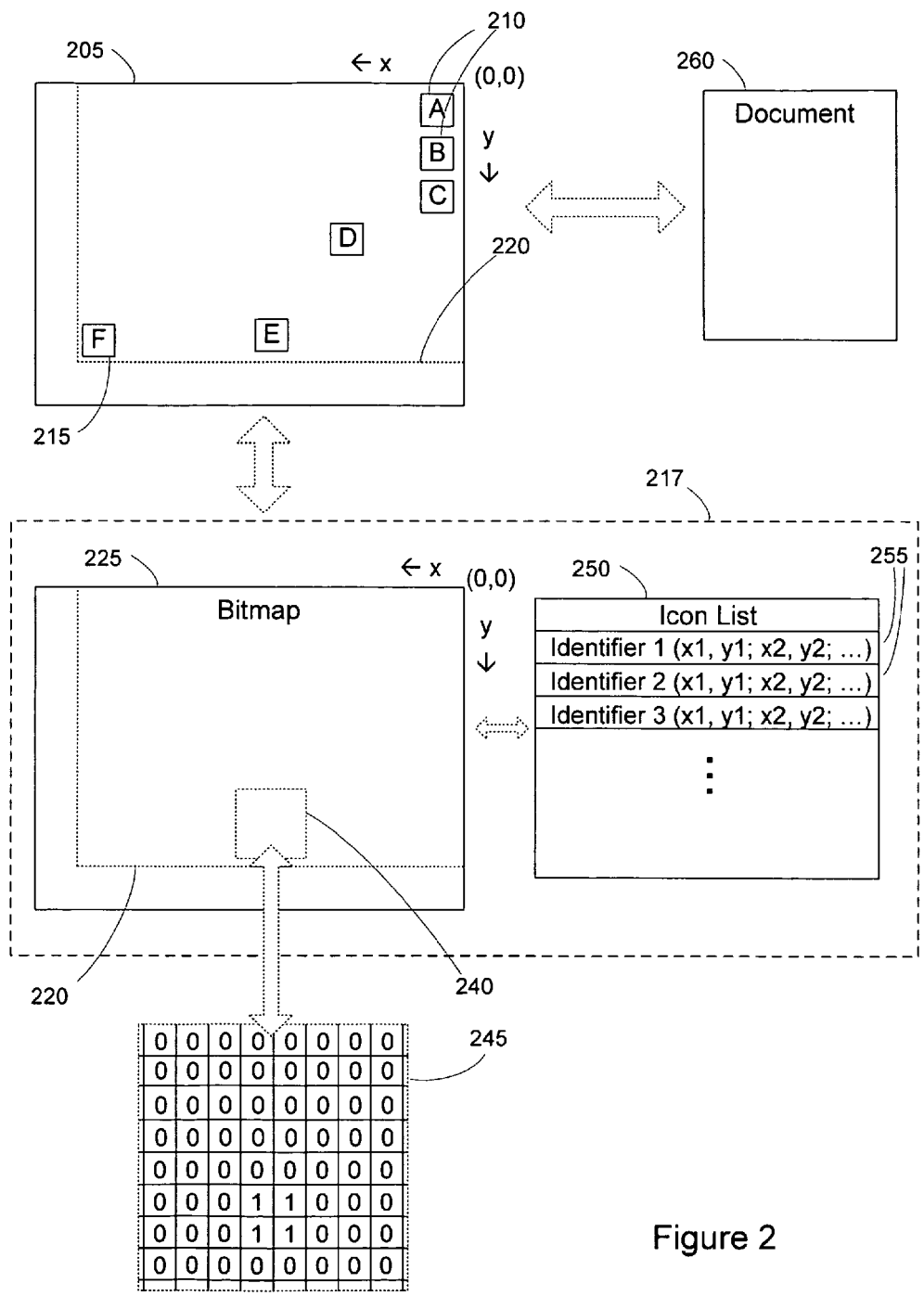
FIG. 2 is a conceptual diagram of the relationship between an icon layout and data representing the icon layout.

FIG. 2 is a conceptual diagram of the relationship between an icon layout 205 and data representing the icon layout 205. In some embodiments, the data representing the icon layout 205 is preserved in a document 260. The document 260 may be in various formats, such as Extensible Markup Language (XML), HyperText Markup Language (HTML), etc.

In some embodiments, the data representing the icon layout 205 is preserved in a data structure 217. In the example of FIG. 2, the data structure 217 comprises a bitmap 225 and icon list 250 where the bitmap 225 represents the icon layout 205 and the icon list 250 is associated with the bitmap 225. In other embodiments, however, other data structures having different forms and methods for organizing data are used.

In the example shown in FIG. 2, the icon layout 205 is shown in a particular resolution of a display and contains icons "A," "B," "C," "D," E," and "F" 210 and 215. A particular resolution is expressed as an array of pixels where an icon layout displayed in the particular resolution is a pixel array having the same size as the pixel array indicated by the particular resolution. In particular, the icon layout is a pixel array having a number of columns along an x axis and a number of rows along a y axis. As shown in FIG. 2, the origin (at coordinates (0,0)) of the pixel array 205 is the upper right corner of the pixel array, although, in other embodiments, the origin is another corner of the pixel array 205.

Each icon 210 and 215 in the icon layout (pixel array) 205 has at least one pair of associated column and row pixel-array coordinates that indicate the pixel position of the icon in the icon layout. Depending on the size of the icon, an icon may cover multiple pixel positions so that multiple pairs of column and row pixel-array coordinates are associated with the icon.

In some embodiments, a bitmap 225 that represents the icon layout 205 and indicates positions of icons in the layout is created for each resolution setting. The bitmap 225 is a bit array having a number of columns along an x axis and a number of rows along a y axis. As shown in FIG. 2, the origin (at coordinates (0,0)) of the bit array 225 is the upper right corner of the pixel array, although, in other embodiments, the origin is another corner of the bit array 225.

Each bit in the bit array 225 has a pair of associated column and row bit-array coordinates that indicate the position of the bit in the bit array 225. Each bit in the bit array 205 corresponds to a pixel in the icon layout 205 that the bit array represents. A bit in the bit array 205 corresponds to a pixel in the icon layout 205 that has equal column and row coordinates. For example, a bit in the bit array having column and row bit-array coordinates of (248, 112) corresponds to a pixel in the icon layout having column and row pixel-array coordinates of (248, 112). A bit in the bit array 225 having a particular value indicates the presence of an icon at the corresponding pixel position in the icon layout 205. As such, a bit in the bit array 225 having a particular value represents an icon in the layout and has associated column and row bit-array coordinates that reflect the position of the icon in the first layout.

In FIG. 2, a sub-region 240 of the bitmap 225 is shown in an expanded view 245. In this example and in the embodiments described below, a bit in the bit array 225 having a value of 1 indicates the presence of an icon at a corresponding pixel position in the icon layout 205, whereas a bit having a value of 0 indicates that an icon is not present at the corresponding pixel position in the icon layout 205. However, in other embodiments, a bit having a value of 0 may indicate the presence of an icon at a corresponding pixel position and a bit having a value of 1 may indicate that an icon is not present at the corresponding pixel position. In the example shown in FIG. 2, the bits having a value of 1 in the expanded view 245 indicate and represent the "E" icon 210 in the icon layout 205.

In some embodiments, the bit array 225 is the same size as the pixel array 205 (i.e., the bit array 225 has the same number of columns and the same number of rows as the pixel array 205). In other embodiments, the size of the bit array 225 is reduced and is smaller than the size of the pixel array 205 (i.e., the bit array 225 has a fewer number of columns and/or a fewer number of rows as the pixel array 205). In these embodiments, the number of columns in the bit array 225 is equal to the highest column pixel-array coordinate of any icon in the layout 205 and the number of rows in the bit array is equal to the highest row pixel-array coordinate of any icon in the layout.

An example of such a reduced bitmap is shown in FIG. 2 where a boundary 220 of the reduced bitmap is indicated by a dashed boundary line. As shown in FIG. 2, a furthermost icon 215 (icon "F" being the furthermost icon from the origin of the pixel array) having the highest column and row pixel-array coordinates of any icon in the layout 205 is the icon that determines the size of the reduced bitmap. By reducing the size of the bitmap in such a manner, storage resources may be conserved while still representing all icons of the layout in the bitmap.

In some embodiments, an icon list 250 associated with the bitmap 225 is also created and stored. The icon list 250 contains one or more icon entries 255 where each entry contains a unique icon identifier associated with a particular icon in the layout 205 (and hence is also associated with a particular bit in the bitmap that represents the particular icon). A unique icon identifier associated with an icon in a layout is typically assigned by the operating system generating the layout and the GUI. Each entry also contains one or more pairs of column and row pixel-array coordinates that indicate the pixel position(s) of the particular icon in the icon layout (and hence also indicates the bit position(s) of the bit(s) representing the particular icon in the bitmap).

Figure 3:
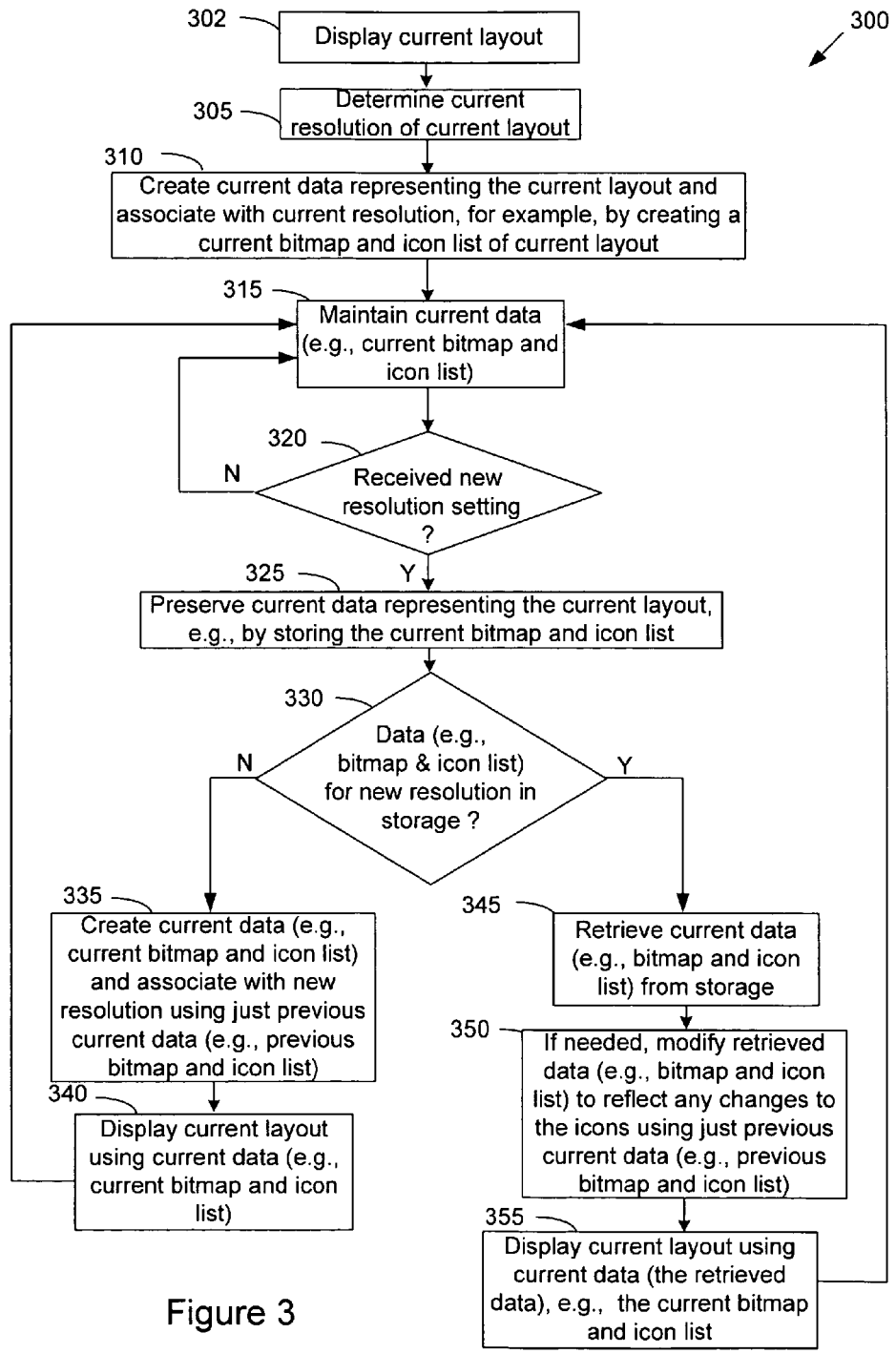
FIG. 3 is a flowchart of a general method for displaying icon layouts in different resolutions.

FIG. 3 is a flowchart of a general method 300 for displaying icon layouts in different resolutions. FIG. 3 is described in relation to FIGS. 4A-B which illustrate an example sequence of resolution and layout changes during two iterations of the general method 300.

The general method 300 is described below in relation to a data structure comprising a bitmap and an icon list that preserves data representing an icon layout at a particular resolution setting. In other embodiments, however, the data structure is any type of persistent data structure having any form and may be, for example, a list, a hashtable, a simple flat database, vectors of data, etc. In further embodiments, the data representing an icon layout is preserved in a document that may be in various formats, such as Extensible Markup Language (XML), HyperText Markup Language (HTML), etc.

Figure 4A:
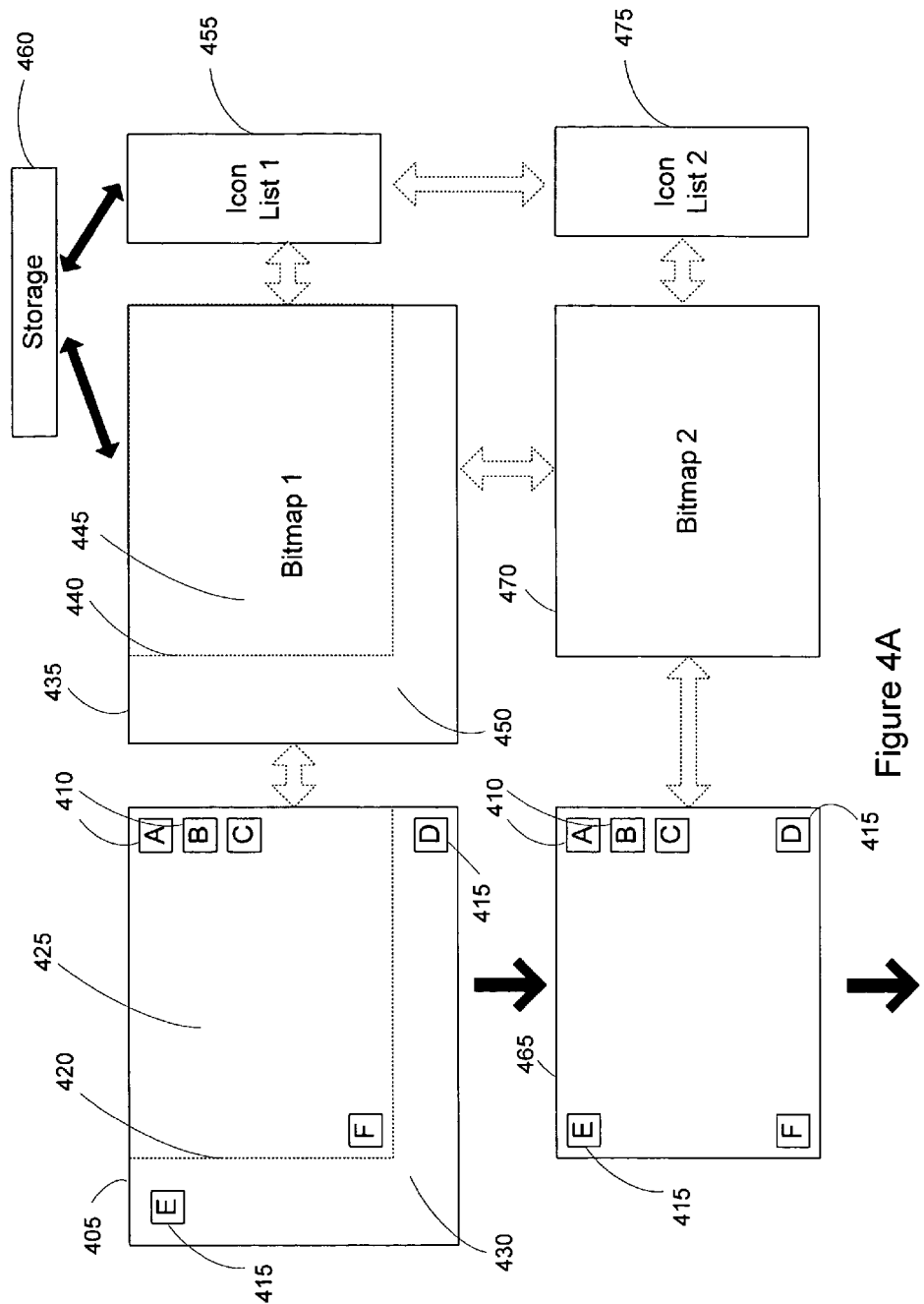
FIGS. 4A-B illustrate an example sequence of resolution and layout changes during two iterations of the general method of FIG. 3.

The general method 300 begins when a current icon layout of a graphical user interface (GUI) is displayed (at 302) in a current resolution, the current layout having one or more icons. The method then determines (at 305) the current resolution of the current layout, for example, through the operating system generating the GUI and the current layout. FIG. 4A shows an example of a current layout 405 at a current resolution, the current layout 405 having icons "A," "B," "C," "D," E," and "F" 410 and 415.

The method 300 then creates (at 310) current data representing the current layout and associates the current data with the current resolution setting. For example, the method may create a current bitmap 435 and icon list 455 based on the current layout. The current bitmap represents the current layout 405 and indicates positions of icons 410 and 415 in the current layout. The current icon list 455 is associated with the current bitmap 435 and the current layout 405. A method 500 for creating the current bitmap and icon list 435 and 455 based on the current layout is discussed below in relation to FIG. 5. After being created, the current bitmap and icon list are then associated (at 310) with the current resolution setting, for example, through use of a resolution setting identifier. An example of a current bitmap 435 and current icon list 455 is shown in FIG. 4A.

The method 300 then maintains (at 315) the current data (e.g., current bitmap and icon list 435 and 455) to represent or reflect the current layout 405 as a user interacts with the current layout through the graphical user interface. The user may, for example, add or delete icons from the current layout. A method 600 for maintaining the current bitmap and icon list 435 and 455 is discussed below in relation to FIG. 6.

The method then determines (at 320) if a new resolution setting has been received, for example, from the user through the GUI. If not, the method continues at step 315 where the current data (e.g., current bitmap and icon list 435 and 455) continue to be maintained. If so, the method preserves (at 325) the current data (e.g., by storing the current bitmap and icon list 435 and 455 to a storage 460 such as a cache, or other storage device).

The method then determines (at 330) whether data associated with the new resolution setting has already been created and stored. For example, the method may determine whether a bitmap and icon list associated with the new resolution setting has already been created and stored to the storage 460 through use of a resolution setting identifier that associates a bitmap and icon list with a particular resolution setting.

If the method determines (at 330—No) that data (e.g., a bitmap and icon list) have not been stored for the new resolution setting, the method creates (at 335) current data (e.g., a current bitmap and icon list) for the new resolution and associates the current data with the new resolution setting. The method creates the current data using the just previous current data (e.g., just previous current bitmap and icon list) that was stored at step 325. A method 700 for creating current data (e.g., a current bitmap and icon list) using previous current data (e.g., a previous current bitmap and icon list) is discussed below in relation to FIG. 7. FIG. 4A shows an example of a current bitmap and icon list 470 and 475 created for the new resolution.

The method then displays (at 340) a current layout at the new resolution using the current data (e.g., current bitmap and icon list 470 and 475). The bitmap indicates positions of icons in a layout and an icon list contains identifiers that uniquely identify particular icons in the layout and contain icon coordinate positions in the layout. Using the information from the current bitmap and icon list, the operating system generating the GUI can thus display the current layout. FIG. 4A shows an example of a current layout 465 that is displayed at the new resolution setting, the current layout 465 having icons "A," "B," "C," "D," E," and "F" 410 and 415 of the previous layout 405 at the previous resolution setting.

The method then proceeds to step 315 where the method maintains the current data (e.g., current bitmap and icon list 470 and 475) to represent the current layout 465 as the user interacts with the current layout. The example sequence of FIG. 4A continues at FIG. 4B where the user has added icons "M" and "N" 480 and deleted icon "B" 485 in the current layout 465. The current data (e.g., current bitmap and icon list 470 and 475) are updated (at 315) to reflect these changes to the current layout 465.

Figure 4B:
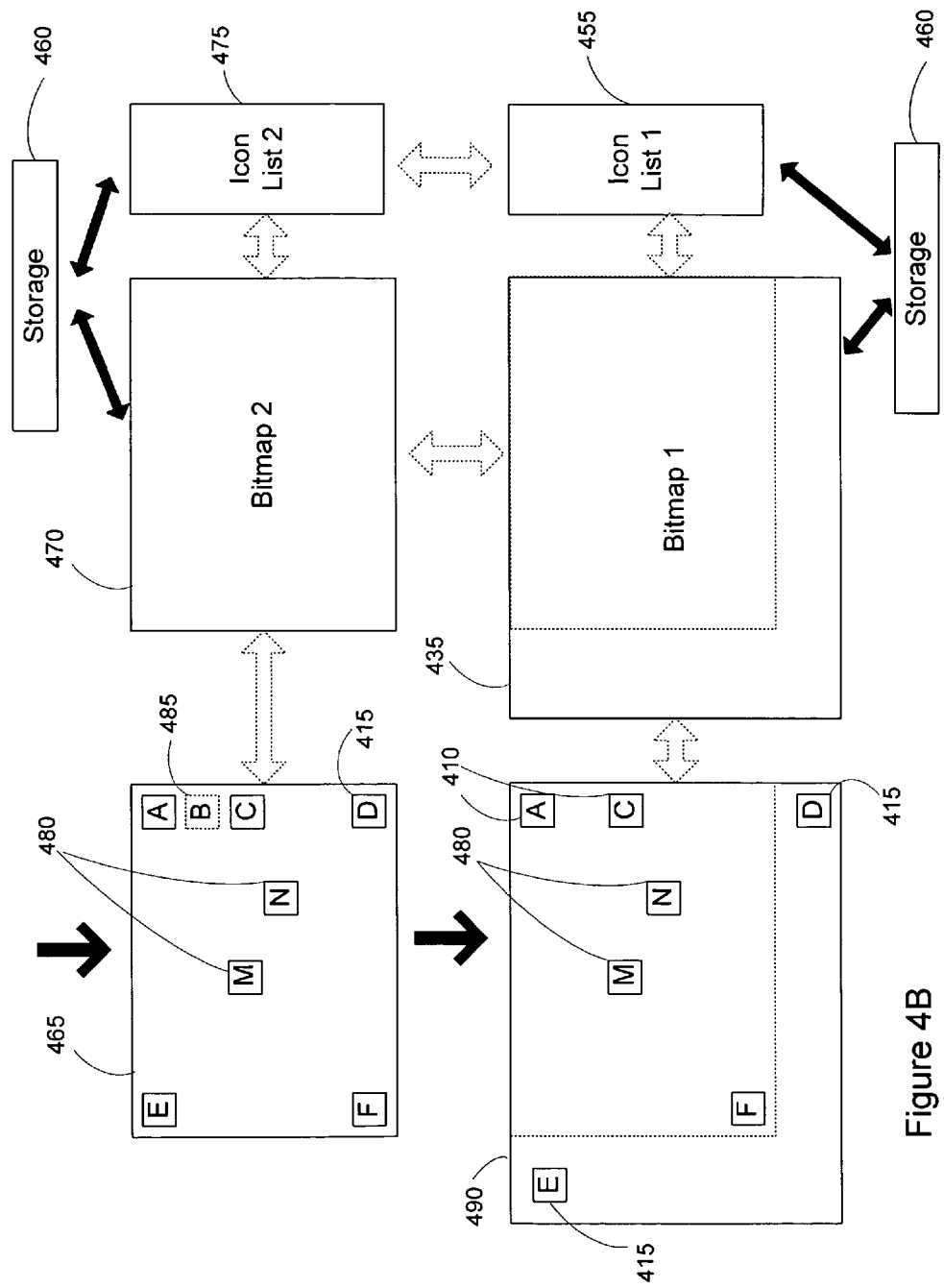

The method then determines (at 320) if a new resolution setting has been received. If so, the method stores (at 325) the current data (e.g., current bitmap and icon list 470 and 475) to the storage 460. The method then determines (at 330) whether data (e.g., a bitmap and icon list) for the new resolution setting has already been created and stored to the storage 460. In the example of FIG. 4B, the new resolution setting that is received is the initial resolution setting of the initial layout 405, the initial resolution setting having associated data (e.g., associated bitmap 435 and icon list 455) that have been saved to the storage 460. As such, the method determines (at 330—Yes) that data (e.g., bitmap and icon list) for the new resolution setting has already been created and stored to the storage 460.

The method then retrieves (at 345) the prior stored data (e.g., bitmap 435 and icon list 455) associated with the new resolution setting. If needed, the method modifies (at 350) the retrieved data (e.g., retrieved bitmap 435 and icon list 455) to reflect any changes made to the icons represented in the retrieved data since the data was stored. In the example of FIG. 4B, the retrieved bitmap 435 and icon list 455 would be modified to reflect the addition of icons "M" and "N" 480 and the deletion of icon "B" 485 in the previous layout 465. The retrieved bitmap 435 and icon list 455 can be modified (at 350) using the just previous current bitmap and icon list. A method 800 for modifying the retrieved bitmap 435 and icon list 455 is discussed below in relation to FIG. 8.

The method then displays (at 355) a current layout at the new resolution using the current data (e.g., current bitmap and icon list) which is the retrieved data (e.g., the retrieved bitmap 435 and icon list 455). FIG. 4B shows an example of a current layout 490 that is displayed at the new resolution setting, the current layout 490 having icons "A," "C," "D," E," "F," "M," and "N" 410, 415, and 480 of the previous layout 465 at the previous resolution setting. Note that the resolution of the current layout 490 is the same resolution as the initial layout 405 and that the current layout 490 is similar in appearance to the initial layout 405 (except for the addition and deletion of icons) even though two resolution changes have occurred between the two layouts. The method then proceeds to step 315 where the method maintains the current data.

FIG. 3 has been described above in relation to a data structure comprising a bitmap and an icon list. The below methods are also described in relation to a data structure comprising a bitmap and an icon list. In other embodiments, however, the data structure is any type of persistent data structure having any form and may be, for example, a list, a hashtable, a simple flat database, vectors of data, etc.

Figure 5:
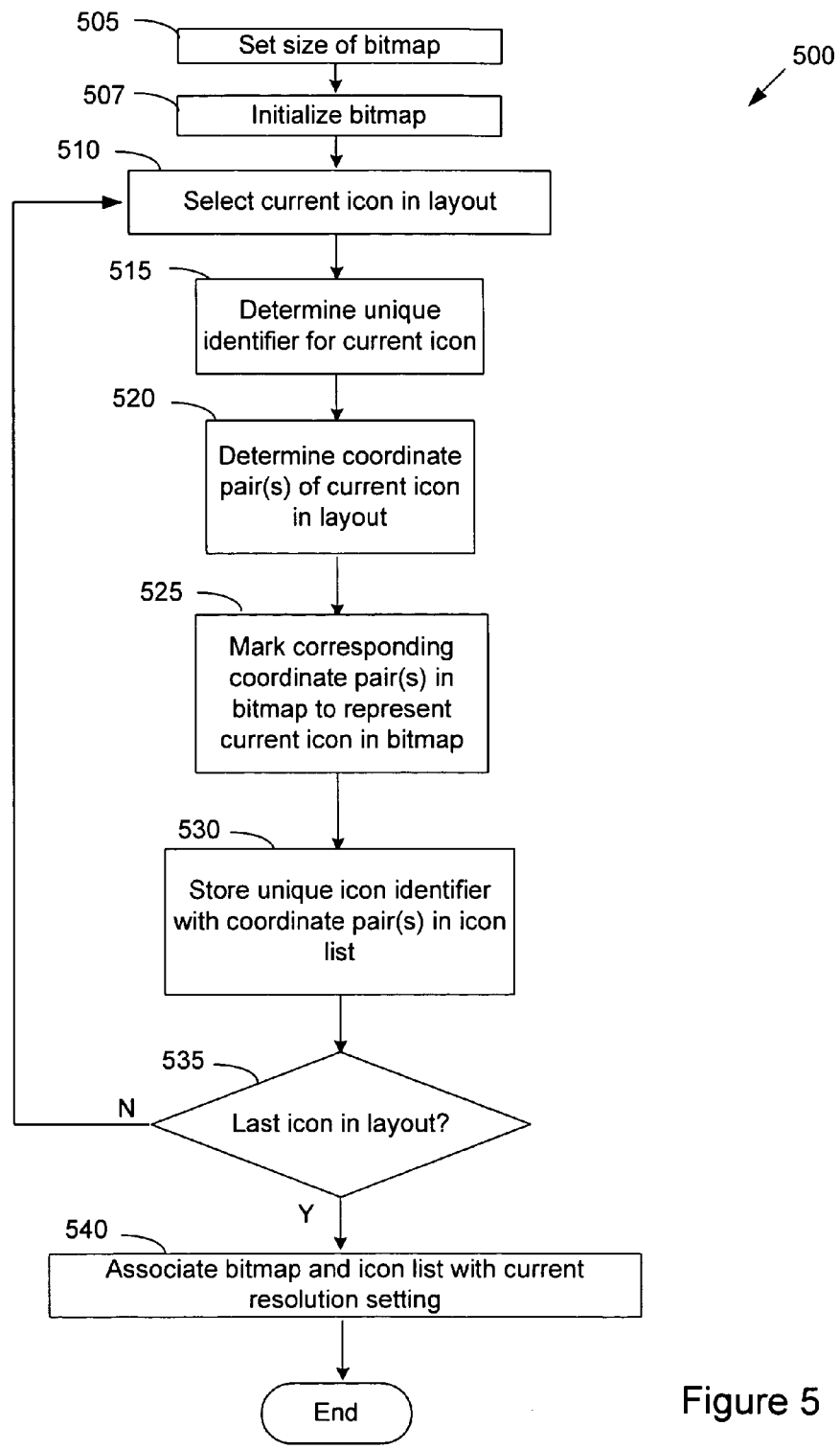
FIG. 5 is a flowchart of a method for creating a bitmap and icon list based on a layout.

FIG. 5 is a flowchart of a method 500 for creating a bitmap and icon list based on a layout. The method 500 comprises step 310 of the general method 300 (discussed in relation to FIG. 3). The method 500 begins by setting (at 505) the size of the bitmap to be created. In some embodiments, the bitmap is set to the same size as the layout that it is based on and represents (i.e., the bit array of the bitmap has the same number of columns and the same number of rows as the pixel array of the layout). The size of the layout is determined by the resolution setting of the layout. In other embodiments, the size of the bitmap is set to a smaller size than the layout (as discussed above in relation to FIG. 2). The method 500 then initializes (at 507) the bitmap, for example, by setting all bit values in the bitmap to 0.

The method then selects (at 510) a current icon in the layout and determines (at 515) the unique icon identifier associated with the current icon (typically generated by the operating system generating the layout). The method then determines (at 520) column and row pixel-array coordinates that indicate the pixel position of the current icon in the layout. Depending on the size of the current icon, an icon may cover multiple pixel positions so that multiple pairs of column and row pixel-array coordinates are determined for the current icon.

The method then marks (at 525) one or more bits in the bitmap having column and row bit-array coordinates corresponding to the column and row pixel-array coordinates (determined at 520). For example, the corresponding bits in the bitmap may be set to the value of 1 to represent the current icon in the bitmap. The method then stores (at 530) the unique icon identifier associated with the current icon (determined at 515) and the coordinates pair(s) of the current icon (determined at 520) as an entry in the icon list.

The method then determines (at 535) whether the current icon is the last icon in the layout. If not, the method continues at step 510 where a next current icon is selected. If so, the method then associates (at 540) the bitmap and icon list with the current resolution setting (determined at step 305 of FIG. 3), for example, through use of a resolution setting identifier. The method 500 then ends.

Figure 6:
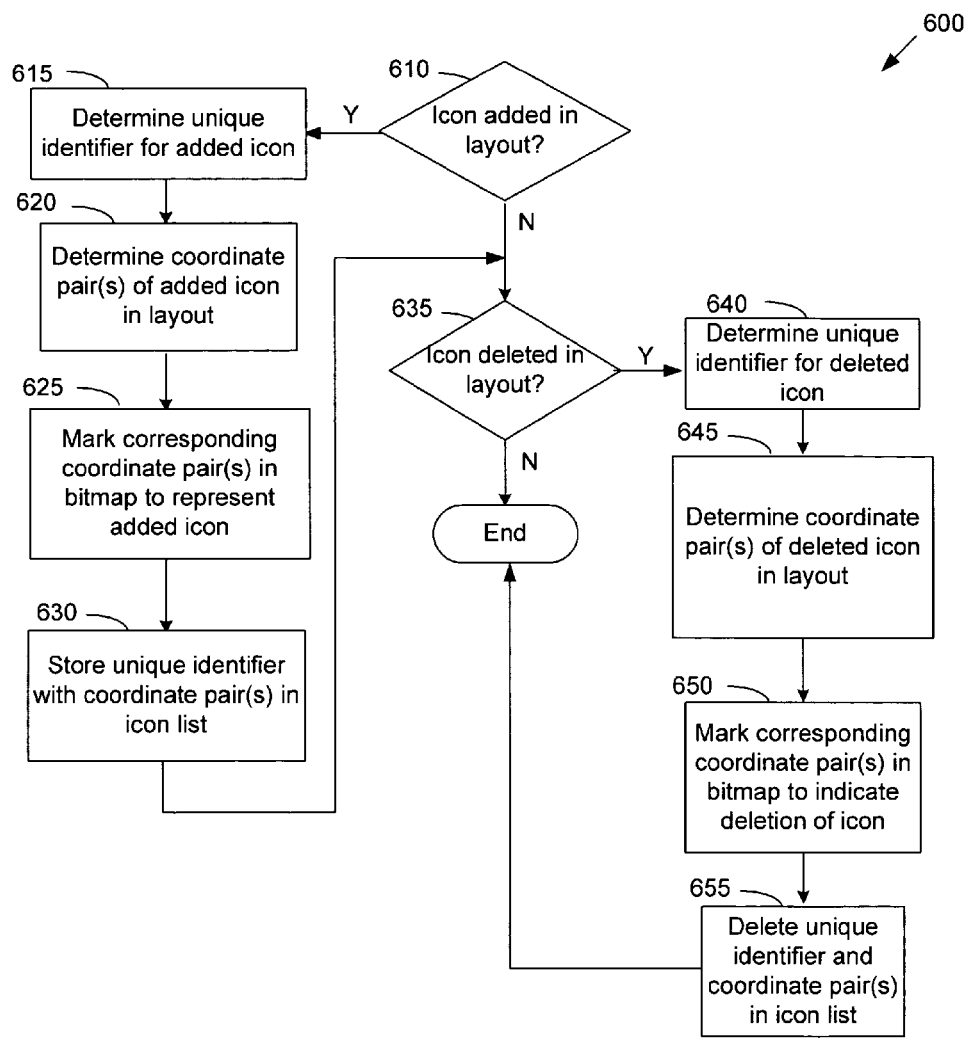
FIG. 6 is a flowchart for maintaining a bitmap representing a layout to reflect changes to the layout.

FIG. 6 is a flowchart for maintaining a current bitmap and icon list to reflect a current layout as a user interacts with the current layout. The method 600 comprises step 315 of the general method 300 (discussed in relation to FIG. 3).

The method 600 begins by determining (at 610) whether an icon has been added in the layout (for example, by determining whether an input to add an icon in the layout has been received). If so, the method determines (at 615) the unique icon identifier associated with the added icon and determines (at 620) coordinates that indicate the pixel position of the added icon in the layout. The method then marks (at 625) one or more bits in the bitmap having corresponding coordinates to represent the added icon in the bitmap. The method then stores (at 630) the unique icon identifier and the coordinates pair(s) of the added icon as an entry in the icon list. The method then proceeds to step 635.

If the method determines (at 610—No) that an icon has not been added in the layout, the method then determines (at 635) whether an icon has been deleted in the layout (for example, by determining whether an input to delete an icon in the layout has been received). If so, the method determines (at 640) the unique icon identifier associated with the deleted icon and determines (at 645) coordinates that indicate the pixel position of the deleted icon in the layout. The method then marks (at 650) one or more bits in the bitmap having corresponding coordinates to indicate the deletion of the icon in the layout (for example, by setting value of the one or more bits to 0). The method then deletes (at 655) the unique icon identifier and the coordinates pair(s) of the deleted icon in the icon list. The method then ends. The method also ends if the method determines (at 635—No) that an icon has not been deleted in the layout.

Figure 7:
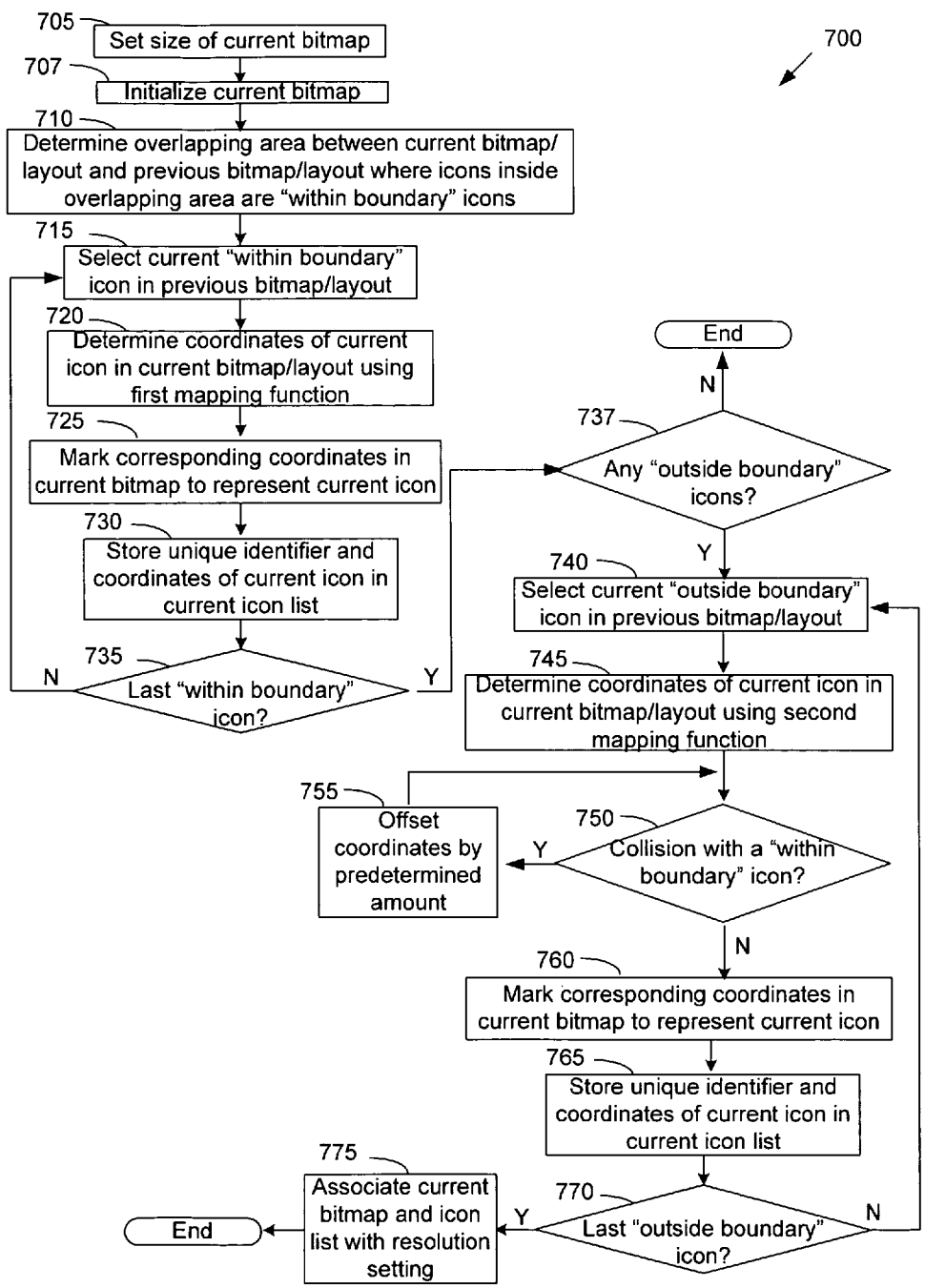
FIG. 7 is a flowchart of a method for creating a current bitmap and icon list for a current resolution using a previous bitmap and icon list for a previous resolution.

FIG. 7 is a flowchart of a method 700 for creating a current bitmap and icon list for a current (new) resolution using a previous bitmap and icon list for a previous resolution. The method 700 comprises step 335 of the general method 300 (discussed in relation to FIG. 3). The method 700 is described in relation to FIGS. 4A-B. Shown in FIG. 4A is a current bitmap and icon list 470 and 475 (for a current layout 465 at a current resolution) that is created using a previous bitmap and icon list 435 and 455 (for a previous layout 405 at a previous resolution).

The method 700 begins by setting (at 705) the size of the current bitmap to be created, the size of the current bitmap being equal to or smaller in size as the current resolution setting (as discussed above in relation to FIG. 2). The method 700 then initializes (at 707) the current bitmap, for example, by setting all bit values to 0.

The method then determines (at 710) an overlapping area between the current bitmap and the previous bitmap, the overlapping area comprising bit positions that exist in both bitmaps (i.e., the overlapping area between the current bitmap and the previous bitmap comprise all bits in the current bitmap that have corresponding bits with the same coordinates in the previous bitmap). Since a bitmap represents a layout and indicates positions of icons in the layout, the overlapping area between the current bitmap and the previous bitmap represents an overlapping area between the current layout (to be produced later) and the previous layout.

FIG. 4A illustrates an overlapping area 445 between the current bitmap 470 and the previous bitmap 435 (indicated by a dashed boundary line 440 in the previous bitmap 435). An outside area 450 not in the overlapping area 445 of the current bitmap 470 and the previous bitmap 435 is also shown. FIG. 4A also illustrates an overlapping area 425 between the current layout 465 and the previous layout 405 (indicated by a dashed boundary line 420 in the previous layout 405). An outside area 430 not in the overlapping area 425 of the current layout 465 and the previous layout 405 is also shown. Icons on the previous layout or represented in the previous bitmap that are inside the overlapping area of the previous layout or bitmap, respectively, are referred to as "within boundary" icons 410 (such as icons "A," "B," "C," and "F"). Icons on the previous layout or represented in the previous bitmap that are outside the overlapping area of the previous layout or bitmap, respectively, are referred to as "outside boundary" icons 415 (such as icons "E" and "D").

The method selects (at 715) a current "within boundary" icon in the previous bitmap/layout. The method then determines (at 720) coordinates of the current icon in the current bitmap/layout using coordinates of the current icon in the previous bitmap/layout and a first mapping function. In some embodiments, the first mapping function is a one-to-one mapping function so that the coordinates of the current icon in the current bitmap/layout is equal to the coordinates of the current icon in the previous bitmap/layout. This is illustrated in FIG. 4A where "within boundary" icons 410 "A," "B," "C," and "F" have the same coordinates in the previous layout 405 and the current layout 465 (and thus the same coordinates in the previous bitmap 435 and the current bitmap 470).

The method then marks (at 725) one or more bits having corresponding coordinates in the current bitmap to represent the current "within boundary" icon. The method then stores (at 730) the unique icon identifier associated with the current "within boundary" icon (which may be determined from the previous icon list) and the coordinates pair(s) of the current icon (determined at 720) as an entry in the current icon list.

The method then determines (at 735) whether the current "within boundary" icon is the last "within boundary" icon in the previous bitmap/layout. If not, the method 700 continues at step 715 where a next current "within boundary" icon is selected. If so, the method then determines (at 737) if there are any "outside boundary" icon in the previous bitmap/layout. If not, the method 700 ends. If so, the method selects (at 740) a current "outside boundary" icon in the previous bitmap/layout.

The method then determines (at 745) coordinates of the current icon in the current bitmap/layout using coordinates of the current icon in the previous bitmap/layout and a second mapping function. In some embodiments, the second mapping function is a scaling function. For example, the scaling function may multiply the coordinates of the current icon in the previous bitmap/layout by a scaling factor to determine the coordinates of the current icon in the current bitmap/layout, the scaling factor being based on the current resolution and the previous resolution. For example, if the current resolution is equal to 800×600 and the previous resolution previous is equal to 1600×1200, the scaling factor may be set to equal 0.5 (the ratio of the current resolution and the previous resolution). This is illustrated in FIG. 4A where "outside boundary" icons 415 "E," and "D" have scaled coordinates in the current layout 465 (and thus scaled coordinates in the current bitmap 470).

The method then determines (at 750) whether the determined coordinates of the current "outside boundary" icon causes a collision (i.e., overlaps) with any "within boundary" icons in the current bitmap/layout. If so, the method then offsets (at 755) the coordinates of the current "outside boundary" icon by a predetermined amount. For example, the predetermined amount may offset the determined coordinates by two columns to the left, or three rows upward, etc.

If the method determines (at 750—No) that no collision is caused, the method then marks (at 760) one or more bits having corresponding coordinates in the current bitmap to represent the current "outside boundary" icon. The method then stores (at 765) the unique icon identifier associated with the current "outside boundary" icon (which may be determined from the previous icon list) and the coordinates pair(s) of the current icon (determined at 745 and 755) as an entry in the current icon list.

The method then determines (at 770) whether the current "outside boundary" icon is the last "outside boundary" icon in the previous bitmap/layout. If not, the method 700 continues at step 740 where a next current "outside boundary" icon is selected. If so, the method then associates (at 775) the current bitmap and icon list with the current resolution setting, for example, through use of a resolution setting identifier. The method 500 then ends.

Note that the method 700 creates a current bitmap and icon list using a previous bitmap and icon list and at least two different mapping functions to map icon coordinates of the previous bitmap to the current bitmap. As such, the method 700 creates a current layout at a current resolution using a previous layout at a previous resolution and at least two different mapping functions to map icon coordinates of the previous layout to the current layout. In particular, the method 700 maps icons to the current bitmap/layout where icons in an overlapping area between the current bitmap/layout and the previous bitmap/layout are mapped with a first mapping function and icons outside the overlapping area are mapped with a second mapping function.

Figure 8:
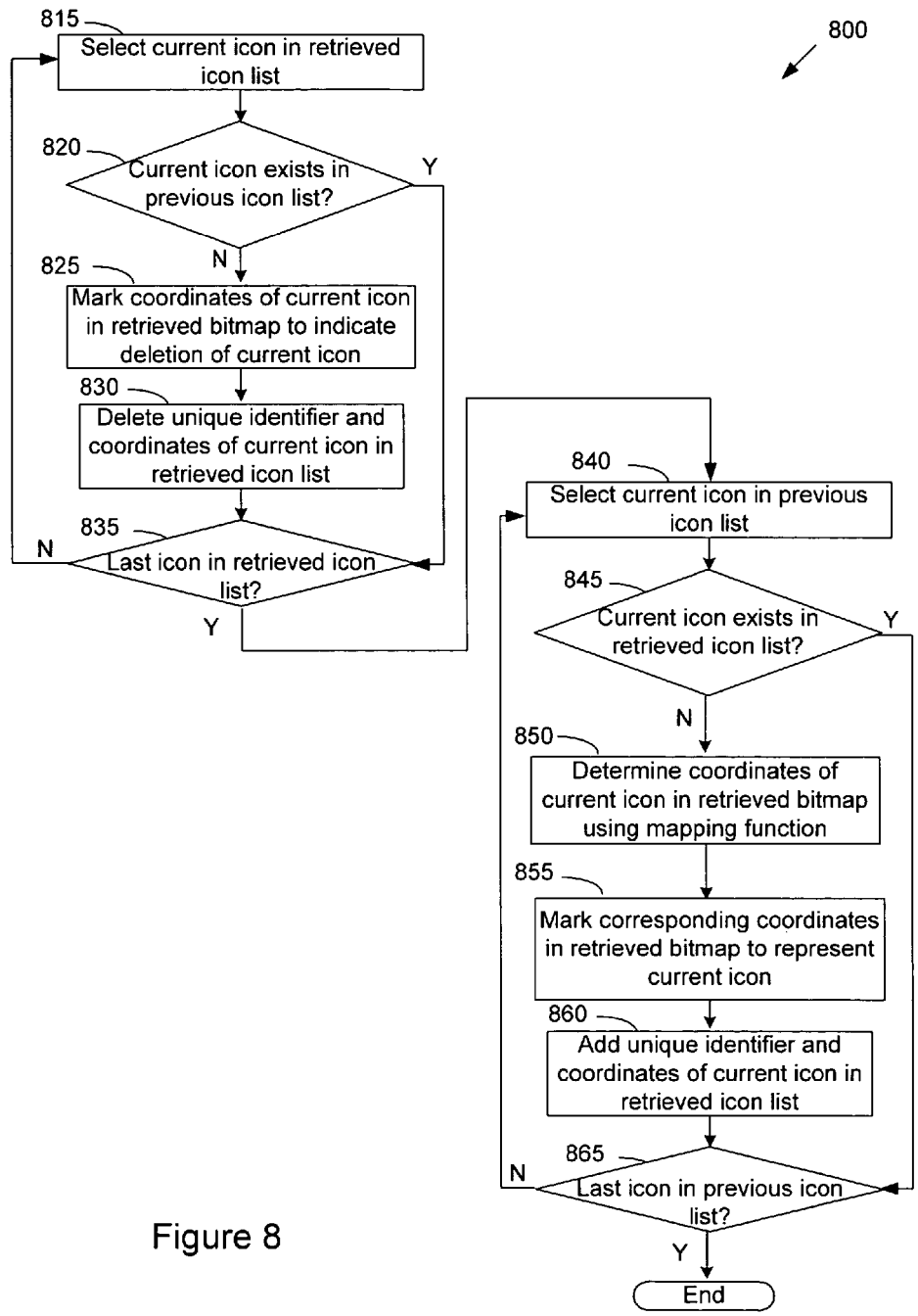
FIG. 8 is a flowchart of a method for modifying a retrieved bitmap and icon list to reflect any changes made by a user.

FIG. 8 is a flowchart of a method 800 for modifying a retrieved bitmap and icon list to reflect any changes made by a user. The method 800 comprises step 350 of the general method 300 (discussed in relation to FIG. 3). The method 800 is described in relation to FIG. 4B. Shown in FIG. 4B is a retrieved bitmap and icon list 435 and 455 (for a current layout 490 at a current resolution) that are modified using a previous bitmap and icon list 470 and 475 to reflect icon changes occurring in a previous layout 465 at a previous resolution. In the example of FIG. 4B, the retrieved bitmap 435 and icon list 455 are modified to reflect the addition of icons "M" and "N" 480 and the deletion of icon "B" 485 in the previous layout 465.

The method 800 begins by selecting (at 815) a current icon entry in the retrieved icon list 455 (each icon entry having a unique identifier for a current icon and bitmap/layout coordinates of the current icon). The method then determines (at 820) whether the current icon entry exists in the previous icon list 475. If so, the method proceeds to step 835.

If the method determines that the current icon entry does not exist in the previous icon list 475, this indicates that the current icon of the current entry has been deleted in the previous layout 465. As such, the method then marks (at 825) one or more bits in the retrieved bitmap having the coordinates of the current icon to indicate the deletion of the current icon (for example, by setting the bit values to 0). The method then deletes (at 830) the current icon entry in the retrieved icon list 455. This is illustrated in FIG. 4B where icon "B" 485 has been deleted in the previous layout 465 and thus deleted from the retrieved bitmap and icon list 435 and 455 (as shown in the current layout 490 which is later produced using the retrieved bitmap and icon list 435 and 455).

The method then determines (at 835) whether the current icon entry is the last icon entry in the retrieved icon list 455. If not, the method proceeds to step 815 where a next current icon entry in the retrieved icon list is selected. If so, the method selects (at 840) a current icon entry in the previous icon list 475 (each icon entry having a unique identifier for a current icon and bitmap/layout coordinates of the current icon). The method then determines (at 845) whether the current icon entry exists in the retrieved icon list 455. If so, the method proceeds to step 865.

If the method determines that the current icon entry does not exist in the retrieved icon list 455, this indicates that the current icon of the current entry has been added in the previous layout 465. As such, the method then determines (at 850) coordinates for the current icon in the retrieved bitmap/layout using coordinates of the current icon in the previous bitmap/layout and a mapping function. The mapping function may be, for example, a one-to-one mapping function or a scaling function. The method then marks (at 855) one or more bits in the retrieved bitmap having the determined coordinates to indicate the addition of the current icon (for example, by setting the bit values to 1). The method then adds (at 860) the current icon entry (with the determined coordinates) in the retrieved icon list 455. This is illustrated in FIG. 4B where icons "M" and "N" 480 has been added in the previous layout 465 and thus added to the retrieved bitmap and icon list 435 and 455 (as shown in the current layout 490 which is later produced using the retrieved bitmap and icon list 435 and 455).

As shown in the example sequence of FIGS. 4A-B, the resolution of the current layout 490 is the same resolution as the initial layout 405 and the current layout 490 is similar in appearance to the initial layout 405 (except for the addition and deletion of icons) even though two resolution changes have occurred between the two layouts. This is due to the fact that the method 800 (described in relation to FIG. 8) restores and leaves unchanged the position of icons that were not modified between the initial layout 405 and the current layout 490.

As such, if an icon is left unmodified, it will appear in the same position in all layouts of a particular resolution since it will have the same position in the bitmap created for the particular resolution, regardless of the number of resolution changes between the layouts. This is illustrated in FIGS. 4A-B where the unmodified "within boundary" icons 410 "A," "C," and "F" are shown in the same position in the initial layout 405 and the current layout 490, the initial layout 405 and the current layout 490 being at the same resolution. Also, the unmodified "outside boundary" icons 415 "E" and "D" are shown in the same position in the initial layout 405 and the current layout 490. Providing unmodified positions of unmodified icons across different layouts of the same resolution is much more intuitive to a user.

Figure 9:
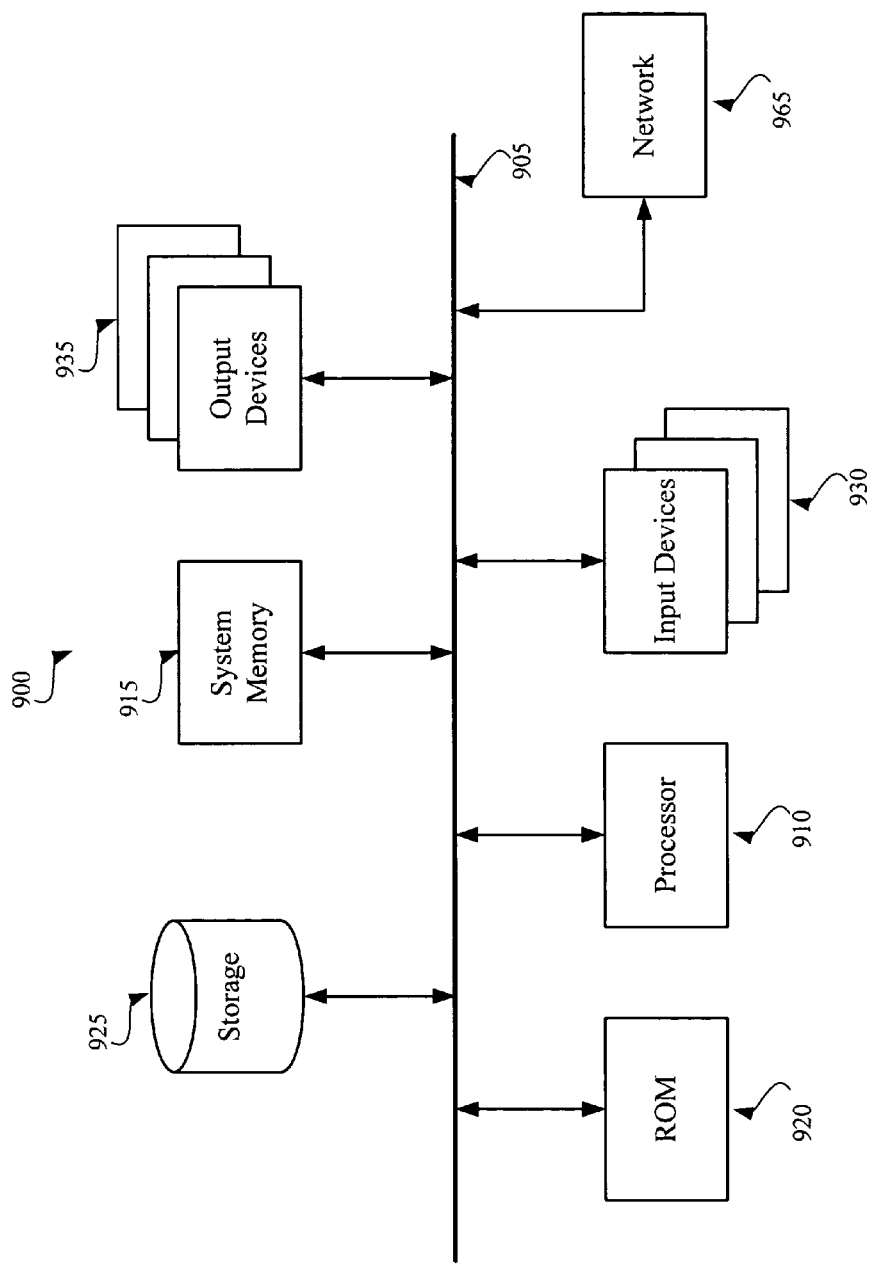
FIG. 9 presents a computer system with which some embodiments of the invention are implemented.

FIG. 9 presents a computer system 900 with which some embodiments of the invention are implemented. The computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925.

The read-only-memory (ROM) 920 stores static data and instructions that are needed by the processor 910 and other modules of the computer system. The permanent storage device 925, on the other hand, is read-and-write memory device. This device is a non-volatile memory unit that stores instruction and data even when the computer system 900 is off. Some embodiments of the invention use a mass-storage device (such as a magnetic or optical disk and its corresponding disk drive) as the permanent storage device 925. Other embodiments use a removable storage device (such as a floppy disk or Zip® disk, and its corresponding disk drive) as the permanent storage device.

Like the permanent storage device 925, the system memory 915 is a read-and-write memory device. However, unlike storage device 925, the system memory is a volatile read-and-write memory, such as a random access memory (RAM). The system memory stores some of the instructions and data that the processor needs at runtime.

In some embodiments, instructions and/or data needed to run the operating system (that generates the icon layouts and the graphical user interface) and to perform methods of the present invention are stored in the system memory 915, the permanent storage device 925, the read-only memory 920, or any combination of the three. From these various memory units, the processor 910 retrieves instructions to execute and data to process in order to execute the processes of the present invention. Further, the system memory 915, the permanent storage device 925, the read-only memory 920, or any combination of the three may be used to store the data structures implemented in the present invention and may comprise a cache that stores the data structures.

The bus 905 also connects to the input and output devices 930 and 935. The input devices 930 enable a user to communicate information and select commands to the computer system 900. The input devices 930 include alphanumeric keyboards and cursor-controllers. The output devices 935 display images generated by the computer system 900. For instance, these devices display a user interface (e.g., graphical user interface) through which the user can interface with the computer system 900 and interact with icons layouts in the graphical user interface. The output devices include printers and display devices, such as cathode ray tubes (CRT) or liquid crystal displays (LCD).

Finally, as shown in FIG. 9, the bus 905 also couples the computer system 900 to a network 965 through, for example, a network adapter (not shown). In this manner, the computer system 900 can be a part of a network of computers (such as a local area network ("LAN"), a wide area network ("WAN"), or an Intranet) or a network of networks (such as the Internet). Any or all of the components of the computer system 900 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, some embodiments have been described with reference to a bitmap and an icon list comprising a data structure. One of ordinary skill in the art will realize, however, that other data structures having different forms and methods for organizing data may also be used. One of ordinary skill in the art would understand that the invention is not to be limited by the foregoing illustrative details, but rather is to be defined by the appended claims.

We claim:

1. A non-transitory computer-readable medium storing computer program instructions executable by at least one processor to perform:

displaying icon layouts at a plurality of different screen resolutions, each different screen resolution indicating a different number of pixels over an entire area of a same display screen, wherein displaying icon layouts at a plurality of different screen resolutions comprises:

displaying a set of icons of a first layout of a user interface ("UI") at a first screen resolution of the display screen;

preserving data indicating positions of the icons in the first layout at the first screen resolution upon a display of the icons at a second, different screen resolution of the same display screen;

receiving a request, after preserving the data, for the first screen resolution; and displaying a second layout of the UI at the first screen resolution using the preserved data indicating positions of the icons in the first layout of the UI.

2. The computer readable medium of claim 1, wherein the computer program instructions are further executable to perform determining, after receiving the request for the first screen resolution, whether the preserved data is stored in a storage.

3. The computer readable medium of claim 1, wherein the computer program instructions are further executable to perform retrieving, after receiving the request for the first screen resolution, the preserved data from a storage.

4. The computer readable medium of claim 1, wherein the computer program instructions are further executable to perform receiving, before preserving the data, a request for the second screen resolution, wherein receiving the request for the second screen resolution triggers the preserving of the data.

5. The computer readable medium of claim 1, wherein the data indicating positions of the icons in the first layout of the UI is preserved in at least one of Extensible Markup Language (XML) format and HyperText Markup Language (HTML) format.

6. A method for displaying icon layouts for a device comprising a display screen for displaying a user interface ("UI") at a plurality of different screen resolutions, the method comprising:
displaying a first layout of the UI at a first screen resolution, the first layout comprising a set of icons;
preserving data associated with the first layout in a data structure comprising a bitmap that represents the first layout and an icon list associated with the bitmap;
displaying the icons of the first layout at a second screen resolution, the first screen resolution and the second screen resolution each indicating a distinct number of pixels over an entire area of the same display screen; and
displaying a second layout of the UI at the first screen resolution using the preserved data associated with the first layout.

7. The method of claim 6, wherein the bitmap comprises a plurality of bits associated with a plurality of positions in the first layout and the icon list comprises at least one entry having a unique identifier associated with a particular icon in the first layout and one or more sets of coordinates that correspond to one or more bits of the bitmap and indicate a location at which the particular icon is displayed in the first layout of the UI.

8. The method of claim 6, wherein displaying the icons of the first layout at the second screen resolution comprises displaying each icon in a same location as in the first layout of the UI.

9. The method of claim 6, wherein preserving the data in the data structure comprises storing the data structure to a storage.

10. The method of claim 9 further comprising:
after displaying the icons of the first layout at the second screen resolution, receiving a request for the first screen resolution; and
after receiving the request for the first screen resolution, retrieving the data structure from the storage.

11. The method of claim 10 further comprising, before storing the data structure, receiving a request for the second screen resolution, wherein receiving the request for the second screen resolution triggers the storing of the data structure.

12. The method of claim 6 further comprising, before preserving the data, receiving a modification that changes a location at which an icon of the first layout is displayed in the first layout.

13. The method of claim 6 further comprising, before preserving the data, receiving a modification to the first layout that adds an icon to the first layout.

14. A method comprising:
storing data representing a first layout of a first plurality of icons at a first resolution, the first resolution indicating a number of pixels over an entire area of a display, said data comprising information corresponding to each icon in the first layout;
displaying a second layout of a second plurality of icons at a second resolution, the second resolution indicating a different number of pixels over the same entire area of the same display, wherein a particular icon of the second layout is one of the icons of the first layout;
while displaying the second layout at the second resolution, receiving a modification to the second layout;
upon receiving a request for the first resolution, modifying the stored data representing the first layout based on the received modification to the second layout; and
displaying a third layout at the first resolution based on the modified data.

15. The method of claim 14, wherein receiving the modification to the second layout comprises receiving an input to add an icon to the second layout, wherein modifying the stored data comprises storing new data comprising information corresponding to the added icon.

16. The method of claim 14, wherein receiving the modification to the second layout comprises receiving an input to remove the particular icon from the second layout, wherein modifying the stored data comprises removing the information corresponding to the particular icon from the data.

17. The method of claim 14, wherein receiving the modification to the second layout comprises receiving an input to move the particular icon to a particular position in the second layout, wherein modifying the stored data comprises identifying a position in the first layout corresponding to the particular position in the second layout by using a scaling function based on a relationship between the first resolution and the second resolution.

18. A computer readable medium storing computer program instructions executable by at least one processor to display icon layouts for a device comprising a display screen and a user interface ("UI") for display on said display screen, said display screen comprising a plurality of different screen resolutions for displaying the UI on the display screen, the computer program instructions executable to perform:
displaying, on the display screen at a first screen resolution, a first layout of the UI comprising one or more icons for concurrently displaying at the first screen resolution;
preserving a first set of data associated with the first screen resolution when the icons of the first layout are displayed at a second, different screen resolution, said first set of data indicating positions of the icons in the first layout of the UI at the first screen resolution;
displaying, on the display screen at the second screen resolution, a second layout of the UI comprising one or more icons for concurrently displaying at the second screen resolution;
preserving a second set of data associated with the second screen resolution when the icons of the second layout are displayed at a third, different screen resolution, said second set of data indicating positions of the icons in the second layout of the UI at the second screen resolution, each screen resolution indicating a distinct number of pixels over an entire area of the same display screen.

19. The computer readable medium of claim 18, wherein the computer program instructions further comprise sets of instructions for:
- receiving, before preserving the first set of data, a request for the second screen resolution, wherein said received request for the second screen resolution triggers the preserving of the first set of data; and
- receiving, before preserving the second set of data, a request for the third screen resolution, wherein said received request for the third screen resolution triggers the preserving of the second set of data.

20. The computer readable medium of claim 18, wherein the computer program instructions further comprise sets of instructions for:
- displaying, on the display screen at the third screen resolution, a third layout of the UI comprising the icons of the second layout;
- receiving a modification of a particular icon in the third layout of the UI;
- receiving a request for the second screen resolution;
- retrieving the second set of data for the second layout;
- modifying the second set of data based on the modification of the particular icon; and
- displaying the second layout of the UI at the second screen resolution with the modified particular icon.

* * * * *